W. W. Crane,
Band Pulley.
Nº 65,349.　　　　　　Patented June 4, 1867.
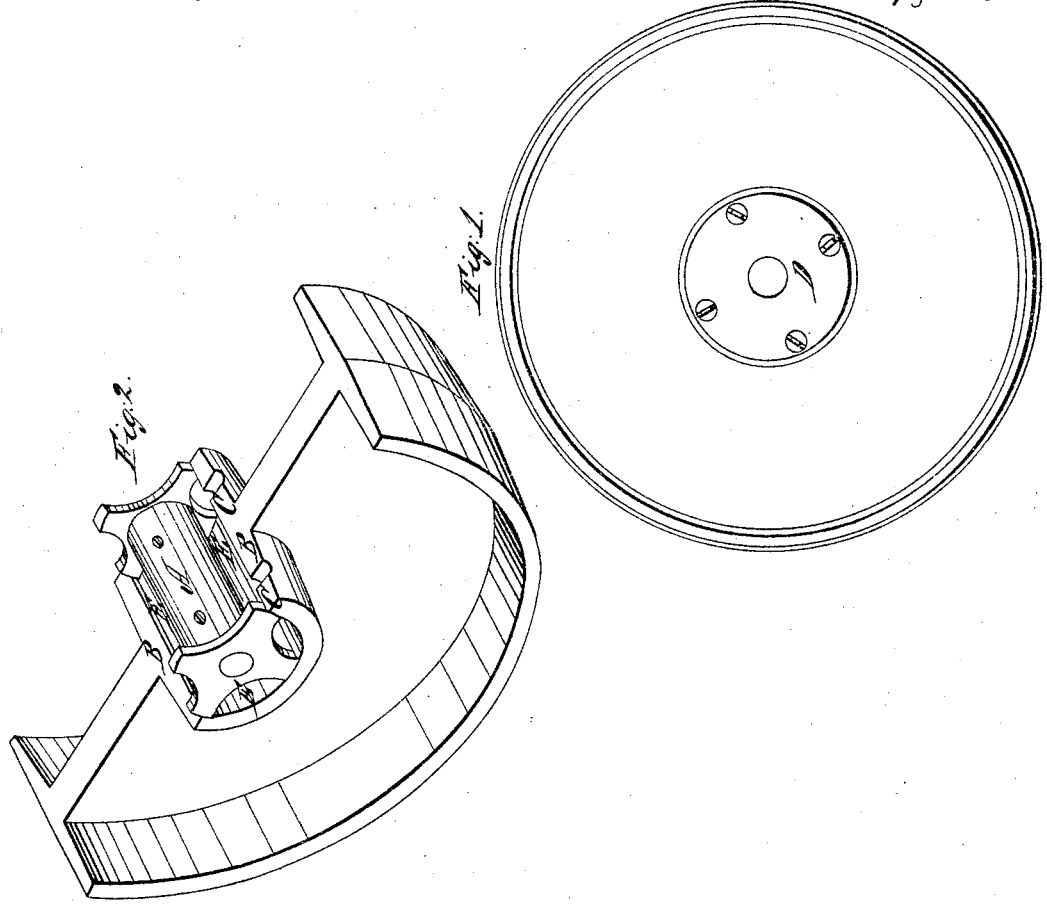
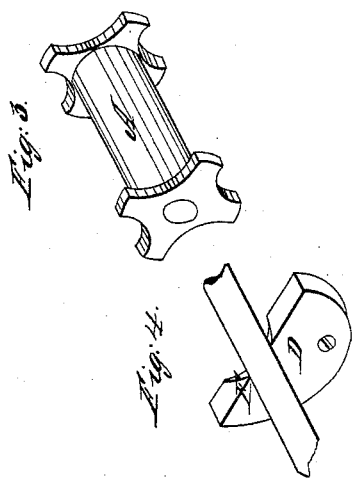
Witnesses:
A. Babbitt
H. Reo
Inventor:
Wellsly W. Crane

United States Patent Office.

WELLSLY W. CRANE, OF AUBURN, NEW YORK.

Letters Patent No. 65,349, dated June 4, 1867.

---

IMPROVEMENT IN CONSTRUCTING SELF-LUBRICATING PULLEYS.

---

The Schedule referred to in these Letters Patent and making part of the same.

---

TO WHOM IT MAY CONCERN:

Be it known that I, WELLSLY W. CRANE, of the city of Auburn, in Cayuga county, New York, have invented a new and improved mode of Constructing the Hubs of Loose Pulleys for the Purpose of more completely Lubricating the same; and I do hereby declare the following to be a full, clear, and exact description of the same, reference being had to the accompanying drawings, making a part of this specification, and to the letters of reference marked thereon.

The frequency that loose pulleys require lubricating, and the difficulty of accomplishing it while the same are in motion, is a common perplexity well known to every person having charge of machinery. Now the object of this invention is to provide a chamber in the hub of said pulley, of such form and dimension, and so arranged, that when once filled and the aperture closed up, it shall require no further attention or lubricating for the space of one year or more.

In order that others skilled in the art may know how to make and use my invention, I will proceed to describe its construction and mode of operation.

Figure 1 is an elevation of the pulley with a cap screwed on to the end of the hub.

Figure 2 is a perspective cross-section, showing the internal arrangement of the same.

Figure 3 is a perspective of the internal hub.

Figure 4 is the plate enclosing the same, and is screwed firmly on to the end of the hub to prevent the oil from escaping. This is a perspective cross-section of the same, showing a portion of the shaft as well.

A, fig. 2, is the internal hub, and is intended to be cast into and form a part of said hub, or it may be made independent and well fitted to the external hub B, and held firmly in its place by either set-screws or keys. C C are openings for pouring in the oil. These are to be closed oil-tight, so that nothing can escape in any way. The cap D is screwed firmly on to the end of the pulley to prevent the oil from escaping, and also for the purpose, when the same is removed, of opening into the oil-chamber E whenever the same may require cleaning. Through the thimble A or internal hub are made apertures 1, 2, &c., for the purpose of admitting the oil to the shaft. The cap D is feather-edged around the shaft at the external surface F, for the purpose of preventing the oil from escaping around the shaft. The opposite end, not shown in the drawing, is made in the same form and for the same purpose.

Now it will be seen that whenever the pulley is standing the oil will settle down into the lower portion of the chamber E; but when motion is communicated thereto, the oil would be uniformly distributed entirely around said chamber. This operation of stopping and starting has the effect to keep the external surface of the internal hub covered with oil, and this is constantly working its way through the internal hub to the shaft, at the apertures 1, 2, &c. The object of feathering the ends of the pulley immediately around the shaft is to prevent the oil from escaping at that point.

It will be seen that if the pulley were made at the end of some thickness the oil would remain between the pulley and shaft, and would be likely to escape more or less therefrom to the outside when running. But when constructed as above described, as soon as the pulley is put in motion, the oil, by the action of the centrifugal force, is driven down the incline and forms around the chamber as before.

Having above described the construction and mode of operation of my invention, what I claim as new, and wish to secure by Letters Patent, is—

1. The chamber E above described, when used substantially in the manner and for the purpose above specified.

2. Constructing the internal or shaft-bearing A, independent of the main portion of the pulley, as and for the purpose above described.

3. Feather-edging the ends of the pulleys for the purpose and in the manner above set forth.

WELLSLY W. CRANE.

Witnesses:
A. BABBETT,
H. REA.